United States Patent
Ahn et al.

(10) Patent No.: US 7,284,890 B2
(45) Date of Patent: Oct. 23, 2007

(54) BACKLIGHT DEVICE OF LIQUID CRYSTAL DISPLAY DEVICE AND METHOD OF FABRICATING THE SAME

(75) Inventors: In Ho Ahn, Taegu-kwangyokshi (KR); Jae Burn Kim, Kyongsanghuk-do (KR); Seung Hoon Yang, Taegu-kwangyokshi (KR)

(73) Assignee: LG.Philips LCD Co., LTd., Seoul (KR)

( * ) Notice: Subject to any disclaimer, the term of this patent is extended or adjusted under 35 U.S.C. 154(b) by 0 days.

(21) Appl. No.: 11/785,493

(22) Filed: Apr. 18, 2007

(65) Prior Publication Data

US 2007/0189037 A1    Aug. 16, 2007

Related U.S. Application Data

(62) Division of application No. 10/670,057, filed on Sep. 25, 2003, now Pat. No. 7,220,039.

(30) Foreign Application Priority Data

Sep. 26, 2002    (KR)   ............................ 2002-58524

(51) Int. Cl.
    *F21V 7/04*    (2006.01)

(52) U.S. Cl. .................. 362/612; 362/231; 362/252; 362/555; 362/800

(58) Field of Classification Search .............. 362/231, 362/252, 555, 612, 800; 349/68–69
See application file for complete search history.

(56) References Cited

U.S. PATENT DOCUMENTS

| | | | |
|---|---|---|---|
| 6,443,597 | B1 | 9/2002 | Natori |
| 6,608,332 | B2 | 8/2003 | Shimizu et al. |
| 6,697,130 | B2 | 2/2004 | Weindorf et al. |
| 6,857,767 | B2 | 2/2005 | Matsui et al. |
| 6,923,548 | B2 | 8/2005 | Lim |
| 2002/0175632 | A1 | 11/2002 | Takeguchi |

*Primary Examiner*—Ali Alavi
*Assistant Examiner*—Jason Moon Han
(74) *Attorney, Agent, or Firm*—Morgan, Lewis & Bockius LLP

(57) ABSTRACT

A backlight device for a liquid crystal includes a substrate, a light source including a first plurality of green light emitting diodes, a second plurality of blue light emitting diodes, and a third plurality of red light emitting diodes arranged along a first row direction on the substrate in an offset matrix-type configuration, wherein white light emitting diodes are disposed at both ends of the configuration of the green, blue, and red light emitting diodes.

12 Claims, 5 Drawing Sheets

BACKLIGHT DEVICE OF LIQUID CRYSTAL DISPLAY DEVICE AND METHOD OF FABRICATING THE SAME

This application is a Divisional of U.S. patent application Ser. No. 10/670,057, filed Sep. 25, 2003, now U.S. Pat. No. 7,220,039 and claims the benefit of Korean Patent Application No. P2002-58524 filed in Korea on Sep. 26, 2002, both which are hereby incorporated by reference in their entirety.

BACKGROUND OF THE INVENTION

1. Field of the Invention

The present invention relates to a display device and a method of fabricating a display device, and more particularly, to a backlight device of a liquid crystal display (LCD) and a method of fabricating a backlight device of a liquid crystal display.

2. Discussion of the Related Art

Cathode ray tubes (CRTs) have been commonly used as monitors for televisions, measuring devices, and information terminals. However, one problem of the CRTs are their size and weight. Accordingly, display devices, such as liquid crystal display (LCD) devices that make use an electro-optics effect, plasma display panel (PDP) device that make use of a gas discharge, and electro-luminescence display (ELD) devices that make use of an electro-luminescence effect, have been developed as replacements for the CRTs. Among these display devices, the LCD devices appear most promising because of their low power consumption, thin profile, and light weight, and are currently employed as monitors for desktop and laptop computers and as large-sized display devices. The LCD devices include an LCD panel for displaying picture images, and a driving part for supplying a driving signal to the LCD panel. The LCD panel has first and second glass substrates bonded to each other to have a predetermined interval, and a liquid crystal material layer is injected between the first and second glass substrates.

On the first glass substrate (i.e., a TFT array substrate), there are a plurality of gate lines arranged along a first direction at fixed intervals, a plurality of data lines arranged along a second direction perpendicular to the gate lines at fixed intervals, a plurality of pixel electrodes in respective pixel regions defined by intersections of the gate and data lines in a matrix-type configuration, and a plurality of thin film transistors (TFTs) responsive to signals transmitted on the gate lines for supplying signals transmitted on the data lines to the pixel electrodes.

The second glass substrate (i.e., a color filter substrate) has a black matrix layer for shielding light from areas excluding the pixel regions, a color filter layer for displaying colored images, and a common electrode for implementing the picture images.

The predetermined interval between the first and second glass substrates is maintained by a plurality of spacers, and the first and second glass substrates are bonded by a sealant pattern having a liquid crystal injection inlet. Once the first and second substrates are bonded together using the sealant pattern, a liquid crystal material is injected through the liquid crystal injection inlet into the predetermined interval. Since the LCD device controls transmittance of ambient light to display image data (i.e., pictures), an additional light source is required, such as a backlight device. The backlight device is classified into a direct-type device and an edge-type device according to a position of a lamp unit.

Presently, various different types of light source devices, such as electro-luminescence (EL) devices, light emitting diode (LED) devices, cold cathode fluorescent lamp (CCFL) devices, and hot cathode fluorescent lamp (HCFL) devices, are commonly used as a backlight device. Among these different types, the CCFL devices have long lifetimes, low power consumption, and thin profiles, and are commonly used as the light source for large-sized color TFT LCD devices.

In CCFL devices, a fluorescent discharge tube is implemented for making use of the Penning effect, which is caused by injection of a hydrargyrum gas containing Argon Ar and Neon Ne at a low pressure. In addition, electrodes are formed at both ends of the fluorescent discharge tube, wherein a cathode electrode is formed having a plate-shape. When a voltage is applied to the electrodes, electric charges inside the fluorescent discharge tube collide against the plate-shaped cathode during a sputtering state, thereby generating secondary electrons. Thus, circumferential elements are excited by the secondary electrons, whereby a plasma is generated. In addition, the circumferential elements emit strong ultraviolet rays, wherein the ultraviolet rays excite a fluorescent substance, thereby emitting visible light.

In the edge-type device, a lamp unit is formed at one side of a light-guiding plate, and includes a lamp, a lamp holder, and a lamp reflecting plate. The lamp emitting light is inserted into both sides of the lamp holder whereby the lamp is protected from external impact. In addition, the lamp reflecting plate covers a circumferential surface of the lamp, and one side of the lamp reflecting plate is inserted to one side of the light-guiding plate to reflect the light emitted from the lamp to the light-guiding plate. In general, the edge-type device is implemented in relatively small-sized LCD devices, such as monitors for laptop and desktop computers. The edge-type device provides for uniform luminance, maintaining a long lifetime, and thin profile.

In general, a multi-color LCD device includes an LCD panel, a backlight, and a color filter. The multi-color LCD device uses a backlight device with a fluorescent lamp that produces three wavelengths as a light source. A white light emitted from the backlight device is divided into red, green, and blue colors in the color filter, and the divided colors are re-mixed to display various colors. The colors of the light source are determined according to chromaticity coordinates of the Commission International De L'eclairage (C.I.E.). That is, tristimulus values X, Y, and Z are calculated from a spectrum of a predetermined light source, and then x, y and z chromaticity coordinates of red, green, and blue are calculated according to a conversion matrix. Subsequently, x and y values of the red, green, and blue are expressed as rectangular coordinates, so that U-shaped spectral locus is drawn, which is called a CIE chromaticity diagram. The general light source has the chromaticity coordinates inside the U-shaped spectral locus. At this time, a triangular space of the red, green, and blue chromaticity coordinates becomes a color realization space. As the triangular space increases, the color realization ratio increases. The color realization depends on color purity and luminance. As the color purity and the luminance increases, the color realization increases. The tristimulus values X, Y, and Z indicate weight of a color-matching function approaching to one spectrum. For example, the Y tristimulus values is a stimulus value of the brightness.

Color temperature represents a hue of a white color according to a color change of the light emitted by a temperature of a heat source. On a common display monitor, the color temperatures are 9300K, 6500K, and 5000K. As the color temperature approaches 9000K, the hue of the white color contains a blue color. Similarly, when the color temperature is 6500K, the hue of the white color contains a red color, and when the color temperature is 5000K, a neutral hue is generated. The color temperature is obtained from the chromaticity coordinates (x, y) of the white color, wherein as the color temperature approaches 9000K it satisfies European broadcasting union (EBU) standards.

In an LCD device, a luminous spectrum of the backlight device is coupled with the color-matching function and transmission spectrum of the color filter to determine the tristimulus values at each wavelength of the visible light region. In order to obtain the various colors, controlling of a correlation between the backlight device and color filter and the tristimulus values is necessary. For example, the luminous spectrum of the backlight device has to be controlled to optimize the color realization and the color temperature, and the transmission spectrum of the color filter has to be controlled to optimize luminosity.

To create the white light, it is necessary to simultaneously use red, green, and blue light emitting diodes (LEDs). However, simultaneous use of the red, green, and blue LEDs to create the white color light may have limited application for practical use. Accordingly, one LED emitting the three wavelengths at a predetermined intensity to generate the white light is needed. Thus, it is required to develop the backlight device using a cold cathode fluorescent lamp for portable devices, such as notebook computers to generate quality color realization, and surface mount devices (SMD) LED of a hand-phone for low power consumption and miniaturization.

FIG. 1 is a cross sectional view of a backlight assembly according to the related art. In FIG. 1, the backlight assembly includes a fluorescent lamp 1, a light-guiding plate 2, a light-diffusion substance 3, a reflecting plate 4, a light-diffusion plate 5, and a prism sheet 6. When a voltage is supplied to the fluorescent lamp 1, some electrons remaining in the fluorescent lamp 1 migrate to the anode, and remaining electrons collide with molecules of argon Ar gas to excite the argon Ar molecules. Accordingly, positive ions are generated that collide with the cathode to generate secondary electrons. When the secondary electrons are discharged to the fluorescent lamp 1, the flow of the electrons collides with hydrargyrum vapor and becomes ionized, thereby emitting both ultraviolet and visible light. Then, the emitted ultraviolet light excites a fluorescent substance deposited on an interior of the fluorescent lamp, thereby emitting light.

Subsequently, the light-guiding plate 2 is formed of Poly Methyl Meth Acrylate (PMMA) having a high light transmittance, and causes the light emitted from the fluorescent lamp 1 to be a plate-type light source. An amount of the light transmitted by the light-guiding plate 2 is related by a ratio of the light-guiding plate thickness and the fluorescent lamp diameter, a distance between the light-guiding plate and the fluorescent lamp 1, and the shape of the reflecting plate. In general, the fluorescent lamp 1 is positioned along an incline at a center of the light-guiding plate 2 along the thickness direction, thereby improving transmission efficiency of the light. The light-guiding plate 2 may be used as a backlight device of an LCD device, and may be categorized as a printing-type light-guiding plate, a V-cut type light-guiding plate, and a scattering-type light-guiding plate.

The light-diffusion substance 3 is comprised of $SiO_2$ particles, PMMA, and a solvent. Since the $SiO_2$ particles have a porosity, they are used for diffusing the light. In addition, PMMA is used for bonding the $SiO_2$ particles to a lower surface of the light-guiding plate 2. The light-diffusion substance 3 is deposited on the lower surface of the light-guiding plate 2 in a dotted pattern, wherein the sizes of the dotted pattern gradually increase to obtain a uniform plate-type light source on an upper surface of the light-guiding plate 2. For example, the dotted pattern has a small size in a unit area near the fluorescent lamp 1; and the dotted pattern has a large size in a unit area apart from the fluorescent lamp 1.

The reflecting plate 4 is formed at the rear of the light-guiding plate 2, whereby the light emitted from the fluorescent lamp 1 is incident on the inside of the light-guiding plate 2. In addition, the light-diffusion plate 5 is formed on the upper surface of the light-guiding plate 2 upon which the dotted pattern is deposited, thereby obtaining a uniform luminance at different viewing angles. The light-diffusion plate 5 is formed of PET or poly-carbonate (PC) resin, and a particle-coating layer is formed on the light-diffusion plate 5 for diffusing the light.

The prism sheet 6 is formed to improve the front luminance of the light transmitted and reflected to the upper side of the light-diffusion plate 5. For example, the prism sheet 6 transmits the light of a predetermined angle, and the light incident on the other angles is totally reflected, whereby the light is reflected to the lower side of the prism sheet 6 by the reflecting plate 4 formed on the lower side of the light-guiding plate 2. The backlight assembly having the aforementioned structure is fixed to a mold frame, and a display unit disposed at an upper side of the backlight assembly is protected by a top sash. In addition, the backlight assembly and the display unit are received between the top sash and the mold frame being coupled to each other.

FIG. 2 is a cross sectional view of a backlight device using a fluorescent lamp according to the related art. In FIG. 2, the backlight unit includes a fluorescent lamp 11, a lamp housing 12; a light-guiding plate 13, a reflecting plate 14, a light-diffusion plate 15, a prism sheet 16, a protection sheet 17, and a main supporter 18. A fluorescent substance is coated on an interior of the fluorescent lamp 11 for emitting light, and the lamp housing 12 fixes the fluorescent lamp 11 and concentrates the light emitted from the fluorescent lamp 11 along one direction. The light-guiding plate 13 provides the light emitted from the fluorescent lamp 11 to an upper side of an LCD panel, and the reflecting plate 14 is bonded to a lower side of the light-guiding plate 13 to reflect the light leaking in an opposite side of the LCD panel to the light-guiding plate 13. The light-diffusion plate 15 is formed on an upper side of the light-guiding plate 13 to uniformly diffuse the light emitted from the light-guiding plate 13. In addition, the prism sheet 16 is formed on an upper side of the light-diffusion plate 15 to concentrate the light diffused in the light-diffusion plate 15 and to transmit the concentrated light to the LCD panel, and the protection sheet 17 is formed on an upper side of the prism sheet 16 to protect the prism sheet 16. The main supporter 18 receives and fixes the aforementioned elements.

In the aforementioned backlight device, the light emitted from the fluorescent lamp 11 is concentrated on an incident surface of the light-guiding plate 13, and then the concentrated light passes through the light-guiding plate 13, the light-diffusion plate 15 and the prism sheet 16, whereby the light is transmitted to the LCD panel. However, the backlight device using the fluorescent lamp has a low color realization ratio due to emitting characteristics of a light source. In addition, the backlight device does not have a high luminance due to limitations, such as size and capacity of the fluorescent lamp.

FIG. 3 is a cross sectional view of a backlight device using an LED according to the related art. In FIG. 3, LED light sources 22 are formed at both sides of a light-guiding plate 21 formed at a rear of an LCD panel to illuminate the LCD panel, so that it is possible to display images on a display screen in dark surroundings. The LED light source 22 is comprised of LED lamps 23 arranged along a one-dimensional structure in red, green, and blue order. The LED lamps 23 of the LED light source 22 are turned ON in order to display an image on the LCD panel. When a voltage is supplied to the red, green, and blue LED lamps 23, the three-colored LED lamps emit light that is scattered in the light-guiding plate 21, thereby generating a color mixture. As a result, the rear of the LCD panel is illuminated with white light.

FIG. 4 is a plan view of a backlight device using an LED according to the related art. In FIG. 4, the backlight unit includes LED lamps 23 and a light-guiding plate 21. The LED lamps 23 include red, green, and blue LED lamps 23a, 23b, and 23c, and the light-guiding plate 21 is formed at a rear of an LCD panel to uniformly diffuse the light emitted from the LED lamps 23 to the LCD panel. In order to emit white light using the LED lamps 23 as a light source, R, G, and B monochromatic light of the LED light source 22 (in FIG. 3) is emitted from the LED lamps 23. In a first area "a" of the light-guiding plate 21, a region 20 is created, wherein the different colored lights emitted from the respective LED lamps 23 do not overlap. Accordingly, it is not possible to create the uniform white light within the region 20. In a second area "b" of the light-guiding plate 21, R, G, and B monochromatic light emitted from the respective LED lamps 23 is mixed, thereby generating the uniform white light.

A luminous point is formed on the light-guiding plate 21 for effectively using the second area "b" of the light-guiding plate 21 in the backlight device, thereby using one-half of the light-guiding plate 21 spaced apart from the LED light source 22. By using the LED lamps 23 as the light source for illuminating the LCD panel, application in miniaturized and low power consumption devices, such as notebook-type personal computers, is possible. In addition, since the LED is a solid-state device, a DC voltage of 1.5V is supplied to the LED, whereby an AC-DC converter is not required. Accordingly, power consumption is greatly decreased. Furthermore, since the LED has greater reliability as compared to CRTs, the LED can be miniaturized-and have a long lifetime.

However, using the backlight device in an LCD device is disadvantageous. For example, it is difficult to uniformly mix the red, green, and blue light emitted from the red, green, and blue LED lamps in order to emit the white light having a quality color realization ratio.

SUMMARY OF THE INVENTION

Accordingly, the present invention is directed to a backlight unit of an LCD device that substantially obviates one or more problems due to limitations and disadvantages of the related art.

An object of the present invention is to provide to a backlight unit of an LCD device, in which a plurality of light-emitting diodes are arranged in a zigzag configuration, thereby improving light efficiency, and minimizing color division area.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a backlight device for a liquid crystal includes a substrate, a light source including a first plurality of green light emitting diodes, a second plurality of blue light emitting diodes, and a third plurality of red light emitting diodes arranged along a first row direction on the substrate in an offset matrix-type configuration, wherein white light emitting diodes are disposed at both ends of the configuration of the green, blue, and red light emitting diodes.

In another aspect, a backlight device for a liquid crystal display includes a substrate, and a light source including a plurality of blocks each having a plurality of green, blue, and red light emitting diodes disposed on the substrate in an offset matrix-type configuration, and white light emitting diodes disposed at both ends of the configuration of the green, blue, and red light emitting diodes.

In another aspect, a backlight device for a liquid crystal display includes a light-guiding plate disposed at a rear of a liquid crystal display panel of the liquid crystal display, a first light source for emitting light along at least one side of the light-guiding plate, the first light source having a first sequential arrangement of green, blue, and green light emitting diodes along a first row direction, and at least one white light emitting diode at one end of the first sequential arrangement of the green, blue, and green light emitting diodes, a second light source for emitting light along the at least one side of the light-guiding plate, the second light source having a second sequential arrangement of blue, green, and red light emitting diodes along a second row direction different from the first row direction, and at least one white light emitting diode at one end of the second sequential arrangement of the blue, green, and red light emitting diodes, a housing adjacent to the light-guiding plate affixing the first and second light sources and concentrating the light emitted from the first and second light sources along a first light direction, and a reflecting plate disposed at a lower portion of the light-guiding plate for reflecting light leaking along a side of the liquid crystal display panel.

In another aspect, a backlight device for a liquid crystal display includes a main light-guiding plate disposed at a rear of a liquid crystal display panel of the liquid crystal display, a sub light-guiding plate disposed on an incident surface along one side of the main light-guiding plate, a first light source for emitting light along one side of the sub light-guiding plate, the first light source includes a first sequential arrangement of green, blue, and green light emitting diodes along a first row direction, and at least one white light emitting diode at an end of the first sequential arrangement of the green, blue, and green light emitting diodes, a second light source for emitting light along the one side of the sub light-guiding plate, the second light source includes a second sequential arrangement of blue, green, and red light emitting diodes along a second row direction different from the first row direction, and at least one white light emitting diode at an end of the second sequential arrangement of the blue, green, and red light emitting diodes, a housing adjacent to the main light-guiding plate affixing the first and second light sources and concentrating the light emitted from the first and second light sources along a first light direction, and first and second reflecting plates disposed at a lower portion of the main light-guiding plate for reflecting light leaking along a side of the liquid crystal display panel.

In another aspect, a method of fabricating a backlight device for a liquid crystal includes forming a light source including a first plurality of green light emitting diodes, a second plurality of blue light emitting diodes, and a third plurality of red light emitting diodes arranged along a first row direction on a substrate in an offset matrix-type configuration, wherein white light emitting diodes are disposed at both ends of the configuration of the green, blue, and red light emitting diodes.

In another aspect, a method of fabricating a backlight device for a liquid crystal display includes forming a light source including a plurality of blocks each having a plurality of green, blue, and red light-emitting diodes disposed on the substrate in an offset matrix-type configuration, and white light-emitting diodes disposed at both ends of the configuration of the green, blue, and red light-emitting diodes.

In another aspect, a method of fabricating a backlight device for a liquid crystal display includes forming a light-guiding plate at a rear of a liquid crystal display panel of the liquid crystal display, forming a first light source for emitting light along at least one side of the light-guiding plate, the first light source having a first sequential arrangement of green, blue, and green light-emitting diodes along a first row direction, and at least one white light-emitting diode at one end of the first sequential arrangement of the green, blue, and green light-emitting diodes, forming a second light source for emitting light along the at least one side of the light-guiding plate, the second light source having a second sequential arrangement of blue, green, and red light emitting diodes along a second row direction different from the first row direction, and at least one white light emitting diode at one end of the second sequential arrangement of the blue, green, and red light emitting diodes, forming a housing adjacent to the light-guiding plate affixing the first and second light sources and concentrating the light emitted from the first and second light sources along a first light direction, and forming a reflecting plate at a lower portion of the light-guiding plate for reflecting light leaking along a side of the liquid crystal display panel.

In another aspect, a method of fabricating a backlight device for a liquid crystal display includes forming a main light-guiding plate at a rear of a liquid crystal display panel of the liquid crystal display, forming a sub light-guiding plate on an incident surface along one side of the main light-guiding plate, forming a first light source for emitting light along one side of the sub light-guiding plate, the first light source includes a first sequential arrangement of green, blue, and green light emitting diodes along a first row direction, and at least one white light emitting diode at an end of the first sequential arrangement of the green, blue, and green light emitting diodes, forming a second light source for emitting light along the one side of the sub light-guiding plate, the second light source includes a second sequential arrangement of blue, green, and red light emitting diodes along a second row direction different from the first row direction, and at least one white light emitting diode at an end of the second sequential arrangement of the blue, green, and red light emitting diodes, forming a housing adjacent to the main light-guiding plate affixing the first and second light sources and concentrating the light emitted from the first and second light sources along a first light direction, and forming first and second reflecting plates at a lower portion of the main light-guiding plate for reflecting light leaking along a side of the liquid crystal display panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
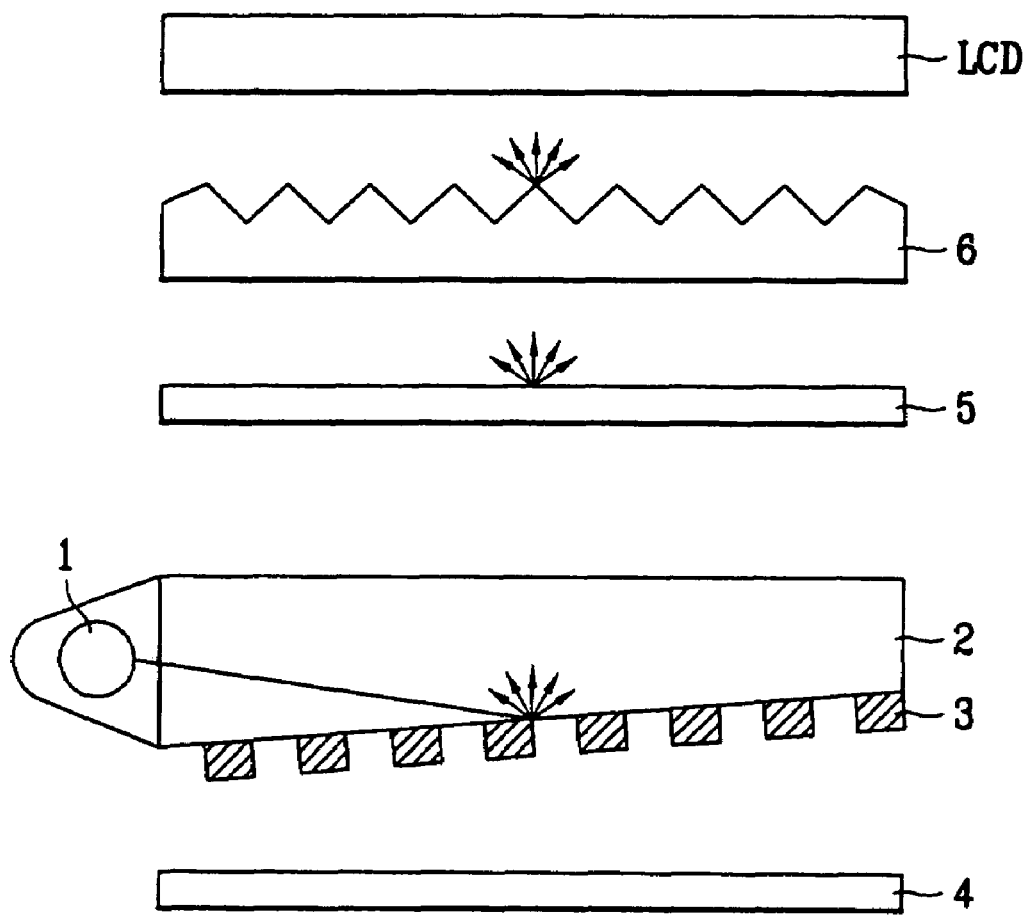
FIG. 1 is a cross sectional view of a backlight assembly according to the related art.
Figure 2:
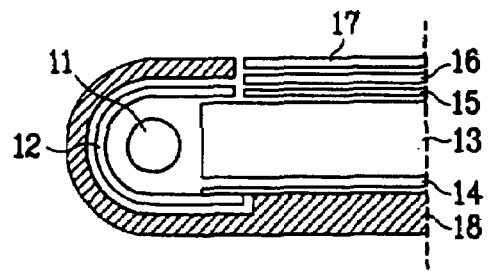
FIG. 2 is a cross sectional view of a backlight device using a fluorescent lamp according to the related art.
Figure 3:
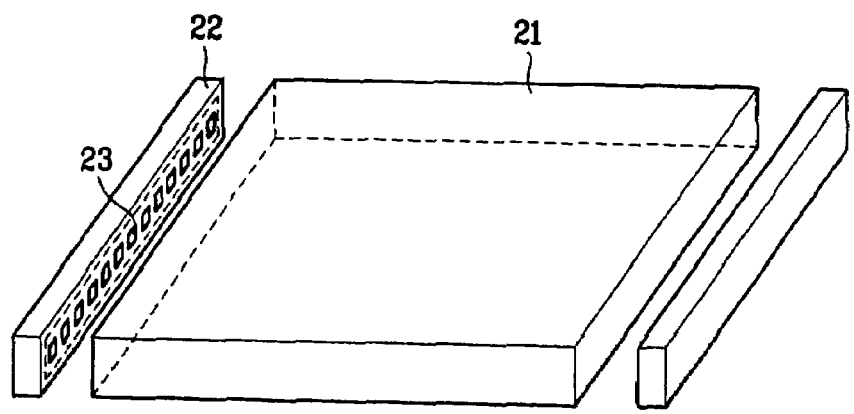
FIG. 3 is a cross sectional view of a backlight device using an LED according to the related art.
Figure 4:
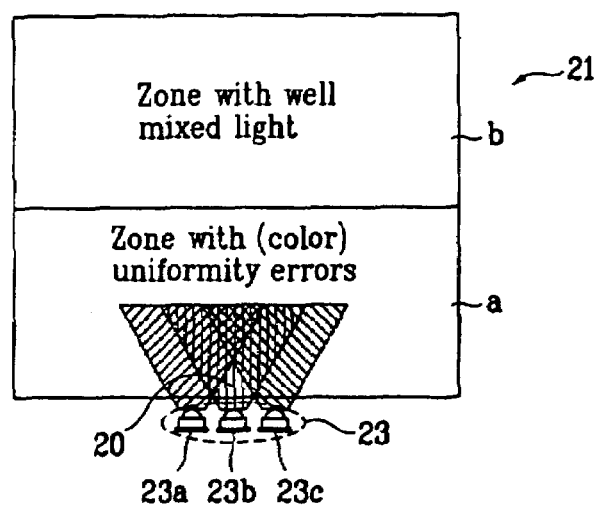
FIG. 4 is a plan view of a backlight device using an LED according to the related art.
Figure 5:
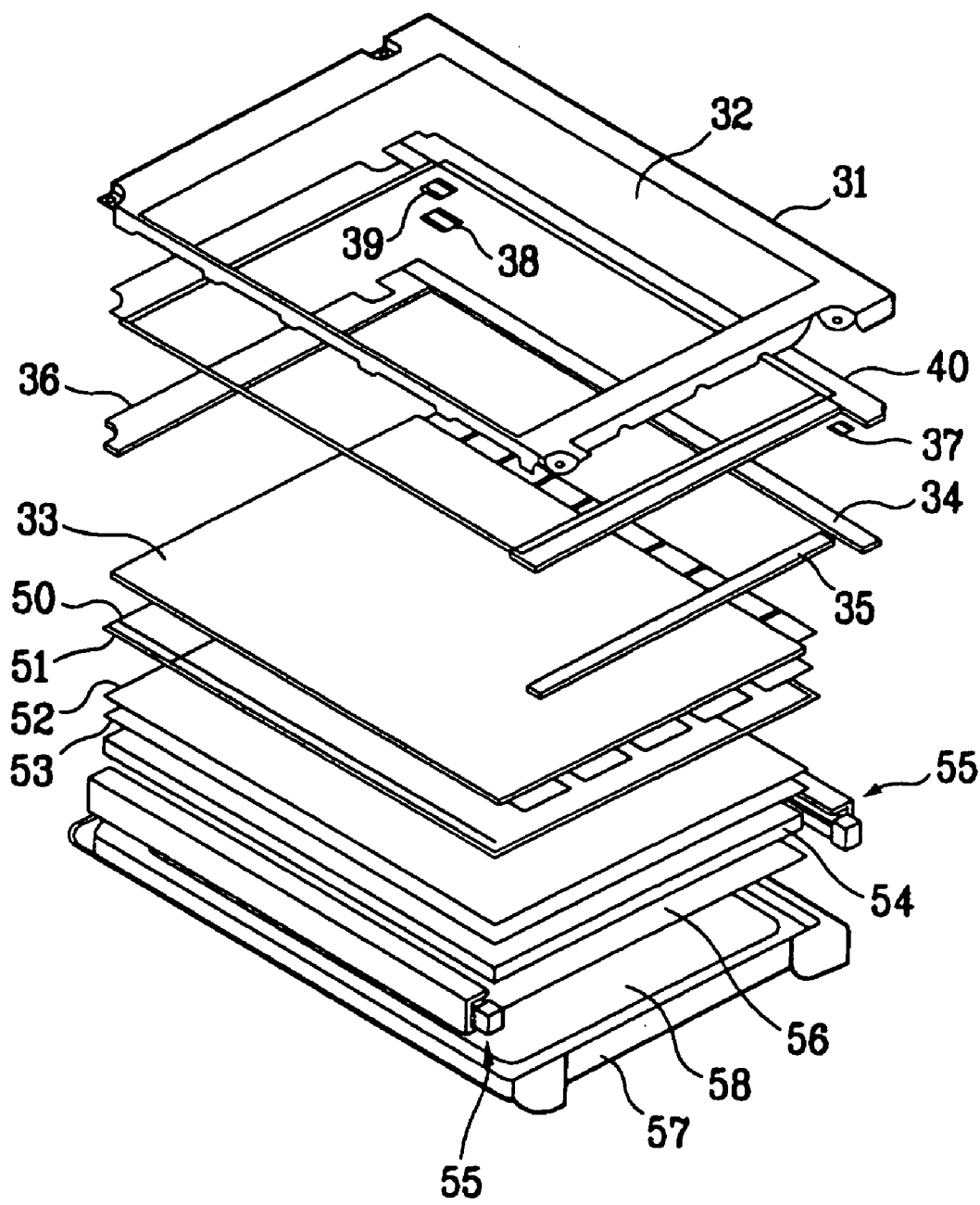
FIG. 5 is a perspective view of an exemplary LCD device according to the present invention.

FIG. 5 is a perspective view of an exemplary LCD device according to the present invention. In FIG. 5, an LCD device may include a metal shield case 31 for forming an upper frame, and a display window 32 for forming an effective screen of an LCD module. An LCD panel 33 may be formed below the shield case 31 and the display window 32, and the LCD panel 33 may include a thin film transistor (TFT) having source and drain electrodes, a gate electrode, and an amorphous silicon layer, and a color filter between two glass substrates. In addition, the LCD panel 33 may include a drain circuit substrate 34, a gate circuit substrate 35, an interface circuit substrate 36, and joiners 37, 38, and 39 for joining the circuit substrates together. The circuit substrates 34, 35, and 36 may be affixed to the shield case 31 by an insulating sheet 40.

A light-shielding space 51 may be formed beneath the LCD panel 33 by a rubber cushion 50, and a light-diffusion plate 52 and a prism sheet 53 may be sequentially formed below the LCD panel 33. The light-diffusion plate 52 may be formed to diffuse light guided by a light-guiding plate, thereby obtaining a uniform plate-type light. In addition, the prism sheet 53 may be formed for improving luminance along a front direction, wherein the light-guiding plate 54 may be formed beneath the prism sheet 53, and fluorescent tube units 55 may be positioned along two sides of the light-guiding plate 54. Furthermore, a reflecting plate 56 may be formed beneath the light-guiding plate 54 to reflect the light incident on the light-guiding plate 54 from the fluorescent tube unit 55 toward the LCD panel 33. A lower case 57 may include an opening 58 formed under the reflecting plate 56. Although not shown, the fluorescent tube unit 55 may include a fluorescent lamp and a lamp housing, wherein the lamp housing may concentrate the light emitted from the fluorescent lamp along one direction.

Figure 6:
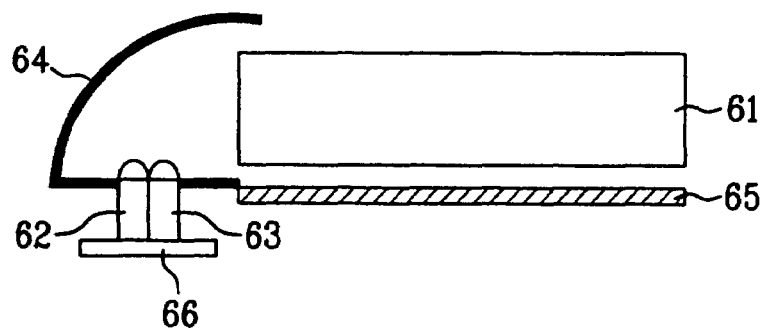
FIG. 6 is a cross sectional view of an exemplary backlight device according to the present invention.

FIG. 6 is a cross sectional view of an exemplary backlight device according to the present invention. In FIG. 6, a backlight device may include a light-guiding plate 61, a first light source 62, a second light source 63, a housing 64, and a reflecting plate 65, wherein the light-guiding plate 61 may be formed at a rear of an LCD panel 33 (in FIG. 5), and the first light source 62 may be formed at one side of the light-guiding plate 61. In the first light source 62, at least one white light-emitting diode may be arranged at one end, and green, blue, and green light-emitting diodes may be sequentially arranged along a first row direction. In the second light source 63, at least one white light-emitting diode may be arranged at one end, and blue, green, and red light-emitting diodes may be sequentially arranged along a second row direction different from the first row direction. In addition, the housing 64 may be formed adjacent to the light-guiding plate 61 to affix the first and the second light sources 62 and 63, and to concentrate light emitted from the first and second light sources 62 and 63 along a first light direction. The reflecting plate 65 may be formed under the light-guiding plate 61 to reflect light leaking along a side of the LCD panel.

The first and second light sources 62 and 63 may be formed on a common substrate 66, such as a printed circuit board. In addition, the green, blue, and green light-emitting diodes of the first light source 62 may be arranged in an offset-type (i.e., zigzag) matrix configuration with respect to the blue, green, and red light-emitting diodes of the second light source 63. The housing 64 may be arranged on the substrate 66 for surrounding light-emitting portions of the respective light-emitting diodes, and may include aluminum material(s).

The respective light-emitting diodes of the first and second light sources 62 and 63 emit the light so that white, red, green, and blue light emitted from the respective light-emitting diodes is incident on the light-guiding plate 61, and scattered in the light-guiding plate 61, thereby mixing the white, red, green, and blue light. As a result, the white light is emitted from an entire surface of the light-guiding plate 61, thereby illuminating the entire surface of the LCD panel with the white light. Then, the white light incident on the LCD panel may be changed according to an alignment direction of liquid crystal molecules, and may be transmitted through the color filter, thereby producing color images. According to the present invention, the red, green, and blue light-emitting diodes are arranged in an offset matrix configuration (i.e., two-dimensional structure), thereby minimizing a color division area. In addition, a total number of light sources used in a unit length increases, whereby light efficiency is improved.

According to the present invention, at least one white light-emitting diode may be arranged at one end of a row arrangement that includes the red, green, and blue light-emitting diodes in order to minimize the color division area. In addition, the housing 64 converts dotted-type light sources emitted from the respective light-emitting diodes into linear-type light sources, thereby concentrating the emitted light. Moreover, the substrate 66 having the first and second light sources 62 and 63 may be formed perpendicular to the light-guiding plate 62 instead of being parallel to the light-guiding plate 61.

Figure 7:
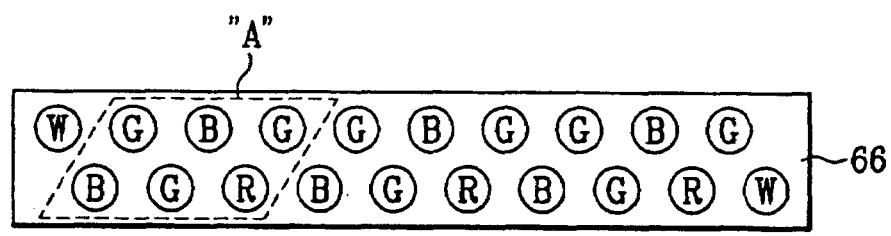
FIG. 7 is a plan view of an exemplary arrangement of LEDs according to the present invention.

FIG. 7 is a plan view of an exemplary arrangement of LEDs according to the present invention. In FIG. 7, a plurality of red R, green G, and blue B light-emitting diodes may be arranged on a substrate 66, such as printed circuit board, in an offset matrix-type configuration (i.e., zigzag pattern), and white W light-emitting diodes for color mixing may be arranged at both ends of the red R, green G, and blue B emitting diodes arrangement. The first and second light sources 62 and 63 (in FIG. 6) may respectively be composed of a plurality of blocks arranging the plurality of red R, green G, and blue B light-emitting diodes in an order of B→G→G→B→R→G. Each block may have the greatest number of green G light-emitting diodes, the number of blue B light-emitting diodes next to the green G emitting diodes, and the smallest number of the red R light-emitting diodes. For example, each block "A" may have three green light-emitting diodes, two blue light-emitting diodes, and one red light-emitting diode.

Figure 8:
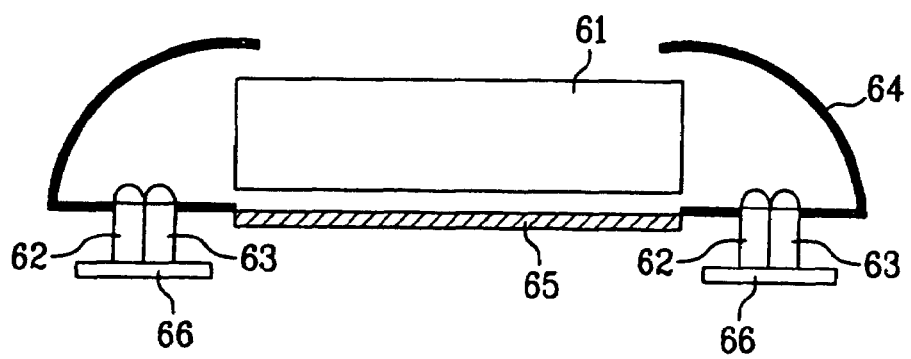
FIG. 8 is a cross sectional view of another exemplary backlight device according to the present invention.

FIG. 8 is a cross sectional view of another exemplary backlight device according to the present invention. In FIG. 8, a backlight device may include a light-guiding plate 61, a first light source 62, a second light source 63, a housing 64, and a reflecting plate 65, wherein the light-guiding plate 61 may be formed at a rear of an LCD panel 33 (in FIG. 5), and the first light sources 62 may be formed along both sides of the light-guiding plate 61. In the first light source 62, green G, blue B, and green G light-emitting diodes may be sequentially arranged along a first direction, and at least one white light-emitting diode may be arranged at one end of the arrangement of the green G, blue B, and green G light-emitting diodes. In the second light source 63, blue B, green G and red R light-emitting diodes may be sequentially formed along a second direction different from the first direction, and at least one white emitting diode may be arranged at one end of the arrangement of the blue B, green G, and red R emitting diodes. The housing 64 may be disposed adjacent to the light-guiding plate 61 and may affix the first and second light sources 62 and 63 to concentrate light emitted from the first and second light sources 62 and 63 along a first light direction. In addition, the reflecting plate 65 may be formed beneath the light-guiding plate 61 for reflecting light leaking along a side of the LCD panel.

The first and second light sources 62 and 63 may be formed on a common substrate 66, such as a printed circuit board. In addition, the green G, blue B, and green G light-emitting diodes of the first light source 62 may be formed in an offset matrix-type configuration with respect to the blue B, green G, and red R light-emitting diodes of the second light source 63. Moreover, the housing 64 may be disposed to surround light-emitting portions of the respective light-emitting diodes arranged on the substrate 66, and may include aluminum Al material(s).

Figure 9:
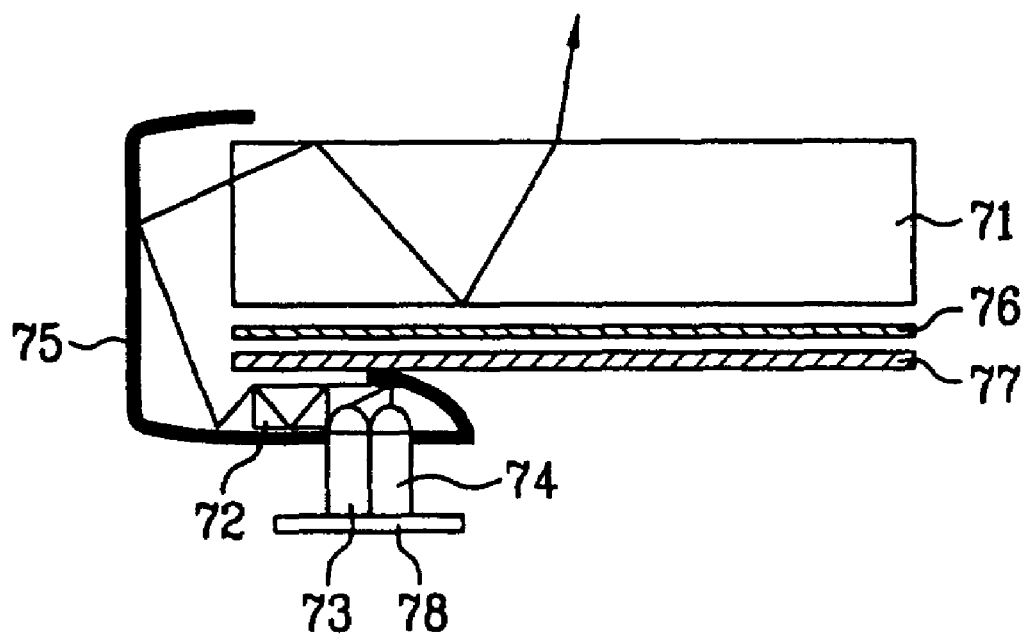
FIG. 9 is a cross sectional view of another exemplary backlight device according to the present invention.

FIG. 9 is a cross sectional view of another exemplary backlight device according to the present invention. In FIG. 9, a backlight device may include a main light-guiding plate 71, a sub light-guiding plate 72, a first light source 73, a second light source 74, a housing 75, and first and second reflecting plates 76 and 77, wherein the main light-guiding plate 71 may be formed at a rear of an LCD panel 33 (in FIG. 5), and the sub light-guiding plate 72 may be formed on an incident surface along one side of the main light-guiding plate 71. The first light source 73 may be formed next to the sub light-guiding plate 72 for sequentially arranging green G, blue B, and green G light-emitting diodes along a first row direction, and at least one white light-emitting diode at one end of the first row direction arrangement of the green G, blue B, and green G light-emitting diodes. In addition, the second light source 74 may be formed along a second row direction different from the first row direction for sequentially and repetitively arranging light-emitting diodes in an order of blue B, green G, and red R light-emitting diodes, and at least one white light-emitting diode at one end of the second row direction arrangement of the blue B, green G, and red R light-emitting diodes. The housing 75 may be disposed adjacent to the main light-guiding plate 71 to affix the first and second light sources 73 and 74, and concentrate the light emitted from the first and second light sources 73 and 74 along a first light direction. Then, the first and second reflecting plates 76 and 77 may be formed beneath the main light-guiding plate 71 for reflecting light leaking along a side of the LCD panel.

The first and second light sources 73 and 74 may be formed on a common substrate 78, such as a printed circuit board. In addition, the green G, blue B, and green G light-emitting diodes of the first light source 73 may be formed in an offset matrix-type configuration with respect to the blue B, green G, and red R light-emitting diodes of the second light source 74. The second reflecting plate 77 may include an aluminum material coated with silver to improve reflectivity, and the housing 75 may surround light-emitting portions of the respective light-emitting diodes on the substrate 78 and may include aluminum Al material(s).

Accordingly, the respective light-emitting diodes of the first and second light sources 73 and 74 emit the light incident on the sub light-guiding plate 72 to be scattered in the sub light-guiding plate 72, thereby mixing the light. As a result, the white light is emitted to an incident surface of the main light-guiding plate 72, and the white light is emitted from the entire surface of the main light-guiding plate 71, thereby illuminating the entire surface of the LCD panel with the white light. Then, the white light incident on the LCD panel may be changed according to an alignment direction of liquid crystal molecules and transmitted through the color filter, thereby producing color images.

In the present invention, an edge-type illumination method is applied to the backlight devices. However, a direct-type method may be applied to the backlight devices. For example, in FIG. 7, the plurality of white W, red R, green G, and blue B light-emitting diodes may be arranged on an entire surface of the substrate 66 or 78, and the substrate 66 or 78 may be positioned below the light-guiding plate 61 or 71 to directly illuminate the LCD panel.

The backlight device according to the present invention has the following advantages. First, the plurality of red R, green G, and blue B light-emitting diodes may be arranged in an offset matrix-type configuration, whereby a total number of the light sources increases in the unit length. Accordingly, light efficiency of the backlight device is improved. In addition, the white light-emitting diode may be disposed at one end of the arrangement of the red R, green G, and blue B light-emitting diodes in the offset matrix-type configuration, thereby minimizing the color division area, and decreasing an external size of the device.

It will be apparent to those skilled in the art that various modifications and variations can be made in the backlight device of liquid crystal display device and method of fabricating a backlight device of the present invention without departing from the spirit or scope of the invention. Thus, it is intended that the present invention cover the modifications and variations of this invention provided they come within the scope of the appended claims and their equivalents.

What is claimed is:

1. A backlight device for a liquid crystal display, comprising:
   a light-guiding plate disposed at a rear of a liquid crystal display panel of the liquid crystal display;
   a first light source for emitting light along at least one side of the light-guiding plate, the first light source having a first sequential arrangement of green, blue, and green light emitting diodes along a first row direction, and at least one white light emitting diode at one end of the first sequential arrangement of the green, blue, and green light emitting diodes;
   a second light source for emitting light along the at least one side of the light-guiding plate, the second light source having a second sequential arrangement of blue, green, and red light emitting diodes along a second row direction different from the first row direction, and at least one white light emitting diode at one end of the second sequential arrangement of the blue, green, and red light emitting diodes;
   a housing adjacent to the light-guiding plate affixing the first and second light sources and concentrating the light emitted from the first and second light sources along a first light direction; and
   a reflecting plate disposed at a lower portion of the light-guiding plate for
   reflecting light leaking along a side of the liquid crystal display panel.

2. The device according to claim 1, wherein the respective white light-emitting diodes of the first and second light sources are arranged at the ends of the first and second row directions.

3. The device according to claim 1, wherein the housing includes aluminum.

4. The device according to claim 1, wherein the first and second light sources are arranged along both sides of the light-guiding plate.

5. A backlight device for a liquid crystal display, comprising:
   a main light-guiding plate disposed at a rear of a liquid crystal display panel of the liquid crystal display;
   a sub light-guiding plate disposed on an incident surface along one side of the main light-guiding plate;
   a first light source for emitting light along one side of the sub light-guiding plate, the first light source includes a first sequential arrangement of green, blue, and green light emitting diodes along a first row direction, and at least one white light emitting diode at an end of the first sequential arrangement of the green, blue, and green light emitting diodes;
   a second light source for emitting light along the one side of the sub light-guiding plate, the second light source includes a second sequential arrangement of blue, green, and red light emitting diodes along a second row direction different from the first row direction, and at least one white light emitting diode at an end of the second sequential arrangement of the blue, green, and red light emitting diodes;
   a housing adjacent to the main light-guiding plate affixing the first and second light sources and concentrating the light emitted from the first and second light sources along a first light direction; and
   first and second reflecting plates disposed at a lower portion of the main light-guiding plate for reflecting light leaking along a side of the liquid crystal display panel.

6. The device according to claim 5, wherein the second reflecting plate includes aluminum coated with silver.

7. A method of fabricating a backlight device for a liquid crystal display, comprising:
   forming a light-guiding plate at a rear of a liquid crystal display panel of the liquid crystal display;
   forming a first light source for emitting light along at least one side of the light-guiding plate, the first light source having a first sequential arrangement of green, blue, and green light-emitting diodes along a first row direction, and at least one white light-emitting diode at one end of the first sequential arrangement of the green, blue, and green light-emitting diodes;
   forming a second light source for emitting light along the at least one side of the light-guiding plate, the second light source having a second sequential arrangement of blue, green, and red light emitting diodes along a second row direction different from the first row direction, and at least one white light emitting diode at one end of the second sequential arrangement of the blue, green, and red light emitting diodes;
   forming a housing adjacent to the light-guiding plate affixing the first and second light sources and concentrating the light emitted from the first and second light sources along a first light direction; and
   forming a reflecting plate at a lower portion of the light-guiding plate for
   reflecting light leaking along a side of the liquid crystal display panel.

8. The method according to claim 7, wherein the respective white light-emitting diodes of the first and second light sources are arranged at the ends of the first and second row directions.

9. The method according to claim 7, wherein the housing includes aluminum.

10. The method according to claim 7, wherein the first and second light sources are arranged along both sides of the light-guiding plate.

11. A method of fabricating a backlight device for a liquid crystal display, comprising:
   forming a main light-guiding plate at a rear of a liquid crystal display panel of the liquid crystal display;
   forming a sub light-guiding plate on an incident surface along one side of the main light-guiding plate;
   forming a first light source for emitting light along one side of the sub light-guiding plate, the first light source includes a first sequential arrangement of green, blue, and green light emitting diodes along a first row direction, and at least one white light emitting diode at an end of the first sequential arrangement of the green, blue, and green light emitting diodes;
   forming a second light source for emitting light along the one side of the sub light-guiding plate, the second light source includes a second sequential arrangement of blue, green, and red light emitting diodes along a second row direction different from the first row direction, and at least one white light emitting diode at an end of the second sequential arrangement of the blue, green, and red light emitting diodes;
   forming a housing adjacent to the main light-guiding plate affixing the first and second light sources and concentrating the light emitted from the first and second light sources along a first light direction; and
   forming first and second reflecting plates at a lower portion of the main light-guiding plate for reflecting light leaking along a side of the liquid crystal display panel.

12. The method according to claim 11, wherein the second reflecting plate includes aluminum coated with silver.

* * * * *